United States Patent [19]

Saito et al.

[11] Patent Number: 4,701,015

[45] Date of Patent: Oct. 20, 1987

[54] WATERPROOF OPTICAL FIBER CABLE AND METHOD OF THE PRODUCTION THEREOF

[75] Inventors: Yasunori Saito; Osamu Ichikawa; Toshio Oshima, all of Yokohama, Japan

[73] Assignee: Sumitomo Electric Industries, Ltd., Osaka, Japan

[21] Appl. No.: 714,858

[22] Filed: Mar. 22, 1985

[30] Foreign Application Priority Data

Mar. 29, 1984 [JP] Japan ................... 59-59571

[51] Int. Cl.⁴ ............................................. G02B 6/44
[52] U.S. Cl. ..................... 350/96.23; 350/320
[58] Field of Search ................... 350/96.23, 320

[56] References Cited

U.S. PATENT DOCUMENTS

| | | | |
|---|---|---|---|
| 4,155,963 | 5/1979 | de Vecchis et al. | 350/96.23 X |
| 4,232,935 | 11/1980 | Rohner et al. | 350/96.23 |
| 4,288,144 | 9/1981 | Nakai et al. | 350/96.23 |
| 4,389,088 | 6/1983 | Trezequet | 350/96.23 |
| 4,401,366 | 8/1983 | Hope | 350/96.23 |
| 4,422,718 | 12/1983 | Nakagome et al. | 350/96.23 |

FOREIGN PATENT DOCUMENTS

| | | |
|---|---|---|
| 0026952 | 4/1981 | European Pat. Off. |
| 3225228 | 1/1983 | Fed. Rep. of Germany |
| 56-6206 | 1/1981 | Japan |
| 60-165917 | 11/1985 | Japan |
| 2041565 | 10/1980 | United Kingdom |
| 2052092 | 1/1981 | United Kingdom |
| 2082790 | 3/1982 | United Kingdom ............ 350/96.23 |
| 2089520 | 6/1982 | United Kingdom ............ 350/96.23 |
| 2094020 | 9/1982 | United Kingdom ............ 350/96.23 |

Primary Examiner—John Lee
Attorney, Agent, or Firm—Cushman, Darby & Cushman

[57] ABSTRACT

In a waterproof optical fiber cable for use in a communication system, one or more optical fibers are loosely put in grooves formed along a spacer and a plurality of filled portions are formed in each of said grooves by being filled with dampproof material with a predetermined interval so as to provide a plurality of filled portions and unfilled portions alternately, whereby undesired local bending of the optical fibers can be prevented. Also a method of making the waterproof optical fiber cable having such filled portions and unfilled portions is disclosed.

5 Claims, 5 Drawing Figures

WATERPROOF OPTICAL FIBER CABLE AND METHOD OF THE PRODUCTION THEREOF

FIELD OF THE INVENTION

The present invention relates to a waterproof optical fiber cable for use in a communication system and the method of the production thereof.

BACKGROUND OF THE INVENTION

When an optical fiber cable is laid from a submarine into the water, the cable is usually subjected to tensile stress by the water pressure. In order to prevent the optical fibers of the cable from being unduly stretched by the tensile stress, the optical fiber cable is provided with a core or spacer with a plurality of grooves extending generally in the lengthwise direction of the cable and the optical fibers are loosely fitted in said grooves in the process of manufacturing of the cable so that the optical fibers are not stretched even if the spacer is expanded by the tensile stress due to the water pressure at the time of and after laying of the cable. In the optical fiber cable of the above type, the respective grooves of the spacer are filled up with dampproof or humidityproof mixed articles with the optical fibers without gap for preventing hydrotaxis along the grooves. As the dampproof mixed filler, conventionally powder filler or jelly filler are used. The powder filler serves to prevent the hydrotaxis but can not serve to prevent water immersion. On the other hand, the jelly filler is superior in preventing the water immersion.

However, the way of distribution of the jelly filler in the conventional optical fiber cable shows a disadvantage of causing the optical fibers to be curled locally, which is so called a microbending. More specifically, when the optical fiber cable is subjected to the tensile stress, the optical fibers are strongly stretched with the expansion of the spacer and in turn upon removing the tensile stress, the spacer recovers to its original length. Recovering of the spacer allows the optical fibers to recover to the original loose state. On the contrary, as shown in FIG. 1, the optical fiber 100 can not fully recover due to a large resistance of the jelly filler 101 against the complete recovering of the spacer 103, whereby there occurs a local micro bending 104.

The micro bending of the optical fibers causes decrement of life of the optical fibers due to increment of the bending stress, also it causes increment of the transmission loss.

There are known other types of the optical fiber cable, one of which is filled with grease as the dampproof filler, another of which is provided with a waterproofing plug disclosed in Japanese Patent Publication (unexamined) No. 6206/1981. They can not dissolve the problem of the micro bending of the optical fiber as mentioned above.

Another prior art of the optical fiber cable is disclosed in Japanese Patent Publication (unexamined) No. 62207/1981 in which the optical fibers in the grooves are secured to the spacer with a predetermined interval. The optical cable disclosed in Japanese Patent Publication 62207/1981 is directed to prevent the movement of the optical fibers in the longitudinal direction, therefore in a case where a local tensile stress or deformation is applied to the optical fibers, the optical fibers are excessively expanded or deformed at the local position subjected to the tensile stress since the optical fibers can not be displaced.

SUMMARY OF THE INVENTION

An essential object of the present invention is to provide an optical fiber cable for use in a communication system for preventing concentration of slack and microbending of the optical fibers as well as preventing hydrotaxis in the optical fiber cable.

Another object of the present invention is to provide a waterproof optical fiber cable in which change of the transmission loss against the slack of the cable is small.

According to the present invention, there is provided a waterproof optical fiber cable for use in a communication system comprising an elongated spacer means formed with at least one groove extending along the spacer, optical fiber means loosely put in said groove, a plurality of filled portions formed in said groove by being filled with dampproof material with a predetermined interval with respect to the longitudinal direction of the spacer so as to provide a plurality of filled portions and unfilled portions alternately, and means for covering at least the outer surface of the filled portions without forming any gap between the outer surface of the filled portion and the covering means.

BRIEF EXPLANATION OF THE DRAWINGS

FIG. 2 is a cross-sectional view of an embodiment of an optical fiber cable according to the present invention taken along a part where fillers are filled in.

DETAILED DESCRIPTION OF A PREFERRED EMBODIMENT

Figure 1:
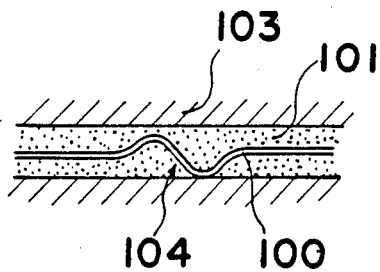
FIG. 1 is a side cross-sectional view showing one example of local bending occurring in the conventional optical fiber cable.
Figure 2:
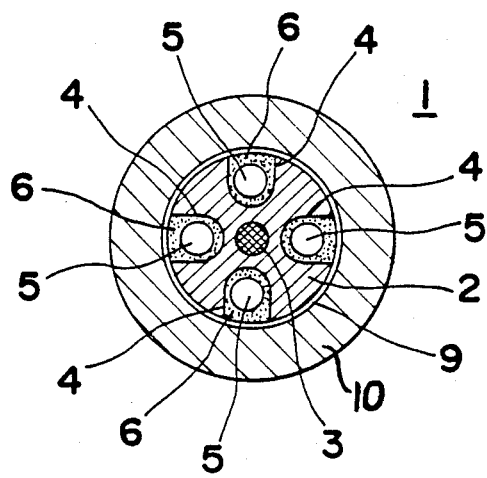
Figure 3:
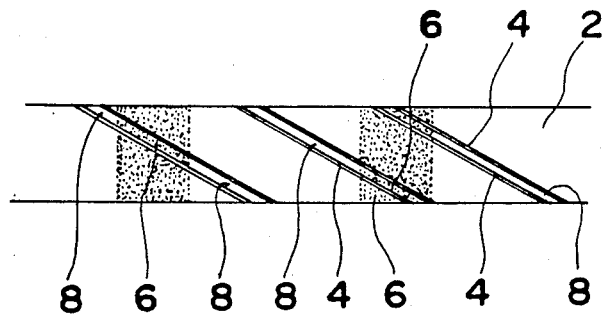
FIG. 3 is a side view of the optical fiber cable shown in FIG. 2 with an outer protection sheath uncovered.

Referring to FIGS. 2 and 3, an optical fiber cable 1 according to the present invention comprises an elongated spacer 2 made of polyethylene resin material having a generally round shape in cross section and a reinforcing strip 3 having a high tensile strength and made of FRP (fiber glass reinforced plastic) material extending in the center portion of the spacer 2 for reinforcing thereof. Four grooves 4 are symmetrically defined on the outer peripheral surface portion of the spacer 2, each of the grooves 4 extends parallel to each other and helically along the spacer 2. Optical fibers 5 are fitted and accommodated in the respective grooves 4 with a uniform looseness. There are formed a plurality of filled portions 6 by filling with jelly polybutene material in each of the grooves 4 and coating around the outer surface of the spacer 2. Said filled portions 6 are formed discontinuously but lined up in the longitudinal direction of the spacer 2 with a suitable interval so as to form said filled portions 6 and unfilled portions 8 alternately.

The spacer 2 to which the optical fibers 5 and the filled portions 6 are put as mentioned above is covered continuously with a cover winding 9 formed by winding non-woven strips therearound without space for preventing separation of the optical fibers 5 and the filled portions 6 from the spacer 2. An outer cover sheath 10 made of polyethylene is formed around the cover winding 9 for protecting the optical fiber cable 1.

As the jelly material of the filled portions 6, various kinds of materials may be used so far as the material can serve to prevent hydrotaxis. For example, flex gel, oil jelly, polybutene jelly or petrolatum jelly may be used as the filler layer material. In a case where the flowability of the jelly material increases in the temperature range, it is preferred to use such a filler material that the flowability is low in the temperature range on which the optical cable is used for suppressing the flow of the jelly material.

One way of eliminating air gaps in the filled portions 6 is to form the cover layer 9 by winding a tape made of porous material in a pressed manner so that jelly material of the filled portions 6 is sunk into the tape. Another way of eliminating air gaps in the filled portions 6 is to form additional layers of filling the jelly on both surfaces of the cover winding 9.

In one modification, dampproof powder mixture may be filled in each space between the filled portion 6 and unfilled portion 8 so as to provide an optical fiber cable of a completely filled configuration, so that the waterproof performance of the optical fiber cable is better than that of the conventional optical fiber cable. In other words, the completely filled configuration of the conventional optical fiber cable has a disadvantage that the density of the filler tends to be non-uniform with respect to the longitudinal direction of the cable due to vibration at the time of transportation and laying the cable, whereby the waterproof performance of the cable is different position to position with respect to the longitudinal direction of the cable.

To the contrary, in the modification of the present invention, the dampproof powder mixture is confined by the jelly of the filled portions 6, whereby the dampproof powder mixture can be prevented from displacement, so that uniform distribution of the fillers can be assured.

Figure 4:
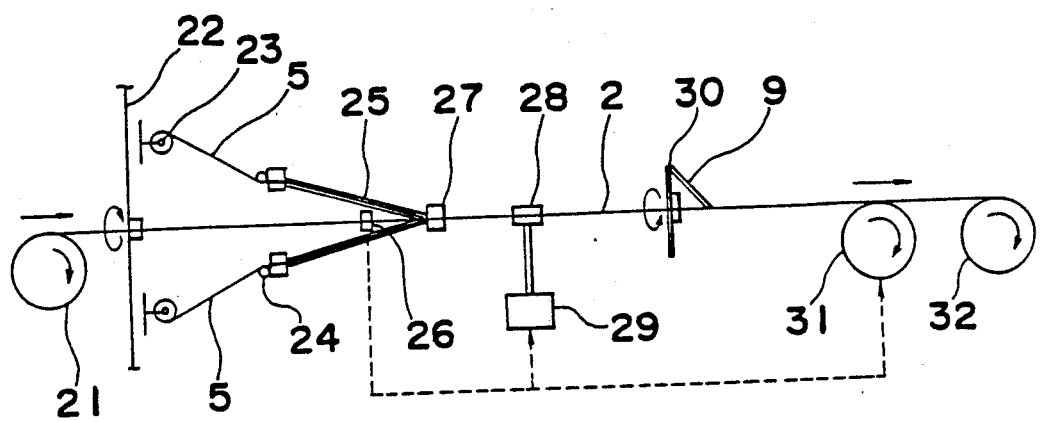
FIG. 4 is a general side elevation view of one example of an apparatus for manufacturing waterproof communication cables.

An example of the process of manufacturing the waterproof optical fiber cable will be explained with reference to FIG. 4. The spacer 2 is released from a supplying bobbin 21 with a constant tension, subsequently passing through the center hole of a rotational cage 22. The optical fiber cables 5 are released respectively from reels 23 secured to the rotational cage 22, being guided towards guide tubes 25 by respective feeding machines 24 without tension. The optical fibers 5 fed to the guide tubes 25 are respectively laid in the grooves 4 of the spacer 2 by a die-cast assembly 27. The feed speed of the spacer 2 is sensed by a speed sensor 26. Jelly material is fed to the spacer 2 at a position behind the die-cast assembly 27 by means of a jelly coating die-cast 28 which is fed with the jelly material from a jelly feeding machine 29 controlled by the output signal of the speed sensor 26 so that the jelly material is filled in the grooves 4 and coated on the peripheral surface of the spacer 2 to form the filled portions 6 at a suitable interval as shown in FIG. 3. Subsequently, tapes are wound around the spacer 2 in a helical shape pressing the spacer 2 and the filled portions 6 with a predetermined pressure by a tape winding machine 30 to provide the cover winding 9. The optical fiber cable thus formed is passed along a capstan 31 and in turn taken up by a take up bobbin 32. The tension applied to each optical fiber 5 and the tension applied to the spacer 2 are determined so that the length of the optical fiber 5 is longer than the length of the groove 4 by either making the supplying tension of the spacer 2 great or making the feeding tension of the optical fiber 5 negative. The amount of the jelly fed to the spacer 2 and the length of the interval of the filled portions 6 are respectively defined corresponding to the slack required to the optical fiber at the time of laying the optical cable and the required waterproof performance.

In a case where the interval between the two adjacent filled portions 6 is short, in order to avoid the concentration of the local bending of the optical fiber, it is desired to make the width of each filler layer 6 as narrow as possible. It is also advantageous to coat jelly material onto the cover winding 9 for suppressing hydrotaxis within the region of the unfilled portion 8.

It is appreciated that in the waterproof cable as mentioned above, since adhesive material is not used for securing the optical fibers 5, it can effectively be avoided that the optical fibers 5 are subjected to the excessive stress even if the local tension stress is applied to the optical fibers.

Figure 5:
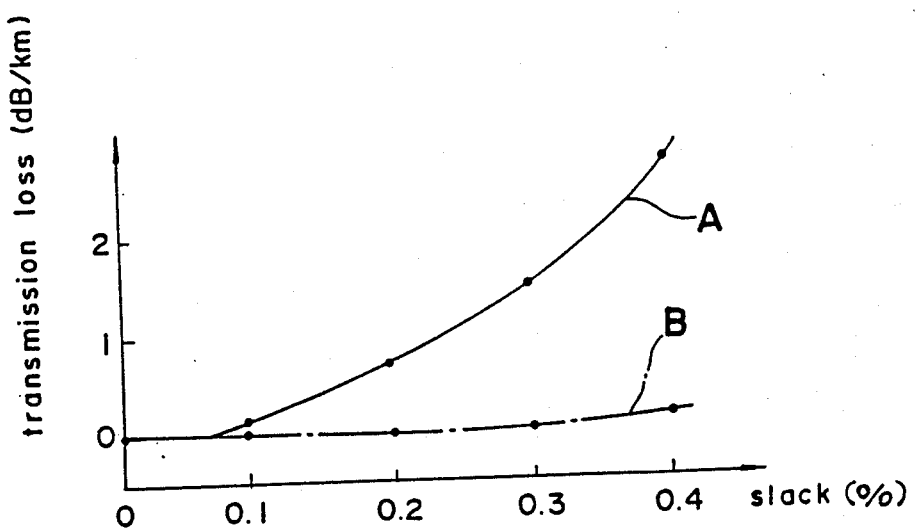
FIG. 5 is a graph showing the change of the transmission loss against the amount of slack of the optical fiber.

Referring to FIG. 5, the curvature B shows the characteristic of the transmission loss against the amount of the slack of the cable occurring in the waterproof optical fiber cable according to the present invention produced by the method as mentioned above. The curvature A shows the characteristic of the conventional cable having the same configuration as the cable of the present invention except that the spacer is continuously filled with the dampproof powder mixture without forming the unfilled portions 8. As apparent from the characteristic curves shown in FIG. 5, in the conventional cable, the greater the slack of the cable, the greater the amount of the transmission loss, to the contrary, in the optical fiber cable according to the present invention, the transmission loss can be kept small even if the slack of the cable increases. It is understood that provision of the unfilled portions 8 is effective for suppressing increment of the transmission loss. The optical fiber used in the example was quartz system optical fiber with a difference of the refraction factor of 1%, core diameter 30 micronmeters, clad diameter 125 micronmeters, finished by coating silicon resin with the finished diameter 0.4 millimeters. The supply tension was about zero gram. The interval between two adjacent grooves of the spacer was 150 millimeters and the width of the groove was 1 millimeter with the depth 1 millimeter. The width of the filled portion 6 was 100 millimeters and the width of the unfilled portion was 500 millimeters. The amount (%) of the slack of the optical fiber shown in FIG. 5 represents the excessive length of the optical fiber against the length of spacer.

What is claimed is:

1. A waterproof optical fiber cable for use in a communication system comprising:
    an elongated spacer formed with at least one groove extending therealong,
    an optical fiber put in said groove in a slack state,
    dampproof jelly material filled into a plurality of first portions of said groove to define first filled portions spaced from one another by a predetermined interval with respect to the longitudinal direction of the spacer,
    dampproof powder material filled into second portions to define second filled portions between said first filled portions, and
    means for covering the outer surface of the first and second filled portions without forming any gap between the outer surface of the first filled portions and the covering means.

2. The waterproof optical fiber cable according to claim 1, wherein said spacer is reinforced by a reinforcing strip extending in the center portion of the spacer.

3. The waterproof optical fiber cable according to claim 1, wherein said spacer is formed with a plurality of grooves extending along the spacer in a helical shape.

4. The waterproof optical fiber cable according to claim 1, wherein said covering means comprises a tape wound around an outer surface of the spacer and running through said filled portions.

5. A method of making a waterproof optical fiber cable with an elongated spacer having spacer grooves therealong, optical fibers, dampproof material, and covering means comprising the steps of:
 expanding the spacer lengthwise,
 putting optical fibers in the spacer grooves,
 releasing the spacer from the expanded state,
 feeding dampproof material to the spacer grooves in a discontinuous manner in sychronism with the releasing speed of the spacer, and
 covering at least the portions filled with dampproof material with the covering means.

* * * * *